United States Patent
Mishima et al.

(10) Patent No.: US 9,582,172 B2
(45) Date of Patent: Feb. 28, 2017

(54) DISPLAY CONTROL APPARATUS AND METHOD, IMAGE DISPLAY APPARATUS, AND NON-TRANSITORY COMPUTER READABLE MEDIUM

(71) Applicant: FUJI XEROX CO., LTD., Minato-ku, Tokyo (JP)

(72) Inventors: Yu Mishima, Kanagawa (JP); Yasushi Ichinowatari, Kanagawa (JP); Tomohito Takagi, Kanagawa (JP); Yuzo Aoshima, Tokyo (JP); Yuki Okabe, Tokyo (JP); Chinatsu Hisamoto, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 474 days.

(21) Appl. No.: 13/857,647

(22) Filed: Apr. 5, 2013

(65) Prior Publication Data

US 2014/0096070 A1    Apr. 3, 2014

(30) Foreign Application Priority Data

Sep. 28, 2012   (JP) ................................ 2012-218672

(51) Int. Cl.
- *G06F 3/0485* (2013.01)
- *G06F 3/048* (2013.01)
- *G06F 3/0488* (2013.01)

(52) U.S. Cl.
CPC ........ *G06F 3/0485* (2013.01); *G06F 3/04886* (2013.01)

(58) Field of Classification Search
CPC .............................. G06F 3/0485; G06F 3/048
(Continued)

(56) References Cited

U.S. PATENT DOCUMENTS

| | | | |
|---|---|---|---|
| 2006/0192881 A1* | 8/2006 | Sato et al. | 348/333.05 |
| 2010/0088641 A1* | 4/2010 | Choi | 715/828 |
| 2011/0122159 A1* | 5/2011 | Bergsten | G06F 3/0482 345/684 |

FOREIGN PATENT DOCUMENTS

| | | |
|---|---|---|
| JP | 04-234789 A | 8/1992 |
| JP | 2006-268010 A | 10/2006 |

(Continued)

OTHER PUBLICATIONS

Communication dated Jul. 5, 2016 from the Japanese Patent Office in counterpart Application No. 2012-218672.

*Primary Examiner* — Andrea Leggett
(74) *Attorney, Agent, or Firm* — Sughrue Mion, PLLC

(57) ABSTRACT

A display control apparatus includes a first controller, a detector, and a second controller. The first controller performs control to divide a display region of a display into divided regions arranged in a first direction, for which attributes of images are determined, and to collectively display images in the divided regions according to each classification item. The display includes a specifying unit specifying a position in the display region and an operation on the displayed image. The detector detects a scrolling operation in a second direction intersecting the first direction. When the scrolling operation is detected and particular divided regions in which images belonging to the same classification item are displayed exist, the second controller performs control to scroll images collectively displayed according to each classification item in the second direction at speeds at which predetermined positions of the displayed images are synchronous among the particular divided regions.

14 Claims, 12 Drawing Sheets

(58) Field of Classification Search
USPC .......................................................... 715/784
See application file for complete search history.

(56) References Cited

FOREIGN PATENT DOCUMENTS

| | | | |
|---|---|---|---|
| JP | 2009-282607 | A | 12/2009 |
| JP | 4573716 | B2 | 11/2010 |

* cited by examiner

DISPLAY CONTROL APPARATUS AND METHOD, IMAGE DISPLAY APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-218672 filed Sep. 28, 2012.

BACKGROUND

Technical Field

The present invention relates to a display control apparatus and method, an image display apparatus, and a non-transitory computer readable medium.

Summary

According to an aspect of the invention, there is provided a display control apparatus including a first controller, a detector, and a second controller. The first controller performs control to divide a display region, displaying an image, of a display into multiple divided regions arranged in a first direction, for which attributes of images to be displayed in the individual divided regions are determined, and to collectively display images of the determined attributes in the individual divided regions according to each classification item. The display includes a specifying unit that specifies a position in the display region and an operation on the image displayed in the display region. The attributes include images of the same classification item among different attributes. The detector detects a scrolling operation, performed via the specifying unit, of specifying scrolling of a displayed image in a second direction intersecting the first direction. The second controller performs, when the scrolling operation is detected by the detector and when multiple particular divided regions that are divided regions in which images belonging to the same classification item are displayed exist, control to scroll images collectively displayed according to each classification item in the second direction at speeds at which predetermined positions of the displayed images are synchronous among the particular divided regions.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the drawings. Note that, in the following exemplary embodiments, the case in which the exemplary embodiments are applied to a smartphone will be described by way of example. However, the exemplary embodiments are not limited to this case, and the exemplary embodiments are applicable to other devices with touch panel displays, such as other mobile phones, personal digital assistants (PDAs), and portable game machines.

The smartphone according to the exemplary embodiments presents multiple menu items to a user to prompt the user to select a desired menu item, thereby activating an application program or software corresponding to the selected menu item. However, the smartphone according to the exemplary embodiments is not limited to such a smartphone. That is, the smartphone according to the exemplary embodiments may activate, in response to an instruction to activate an application program or software, a list displaying function, which will be described later, on the basis of the application program or software given in the instruction. Alternatively, the smartphone according to the exemplary embodiments may activate a list displaying function, which will be described later, by using an application program or software activated by a web browsing function in response to specification of a uniform resource locator (URL).

First Exemplary Embodiment

Figure 1:
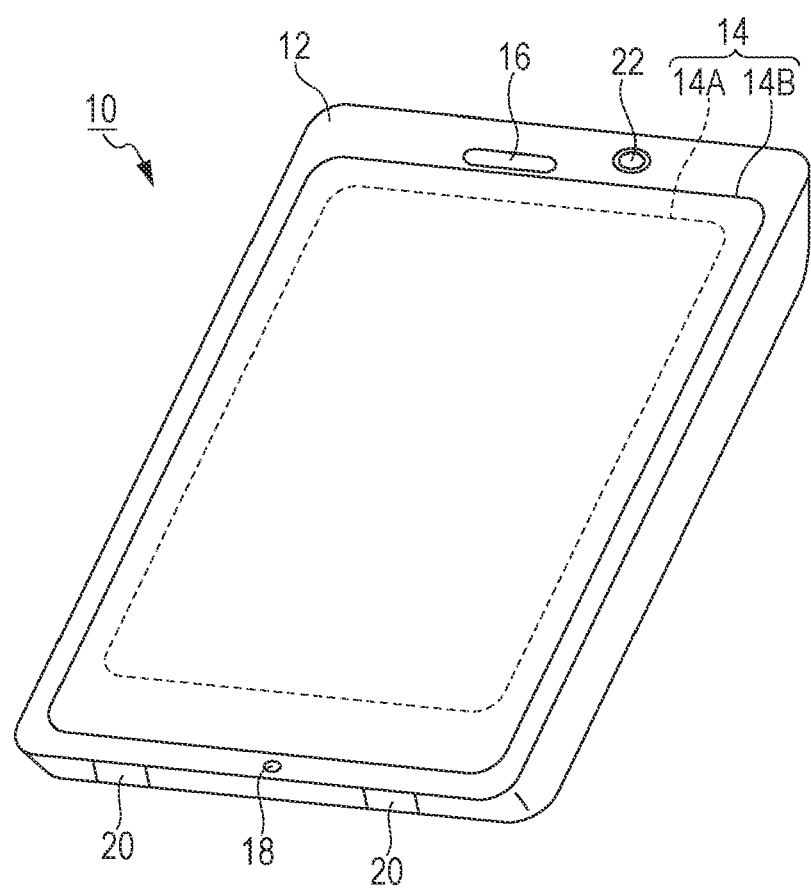
FIG. 1 is a perspective view illustrating the external appearance of a smartphone according to exemplary embodiments.

As illustrated in FIG. 1, a smartphone 10 according to a first exemplary embodiment includes a plate-shaped housing 12. On one of the faces of the housing 12, the smartphone 10 includes a display input unit 14 including a display panel 14A serving as a display and an operation panel 14B configured as a touch panel (specifying unit), which are integrated with each other. The housing 12 further includes a loudspeaker 16, a microphone 18, an operation unit 20, and a camera unit 22. Note that the shape of the housing 12 is not limited to the plate shape, and the housing 12 may adopt a configuration including, for example, a folding structure or a sliding structure.

Figure 2:
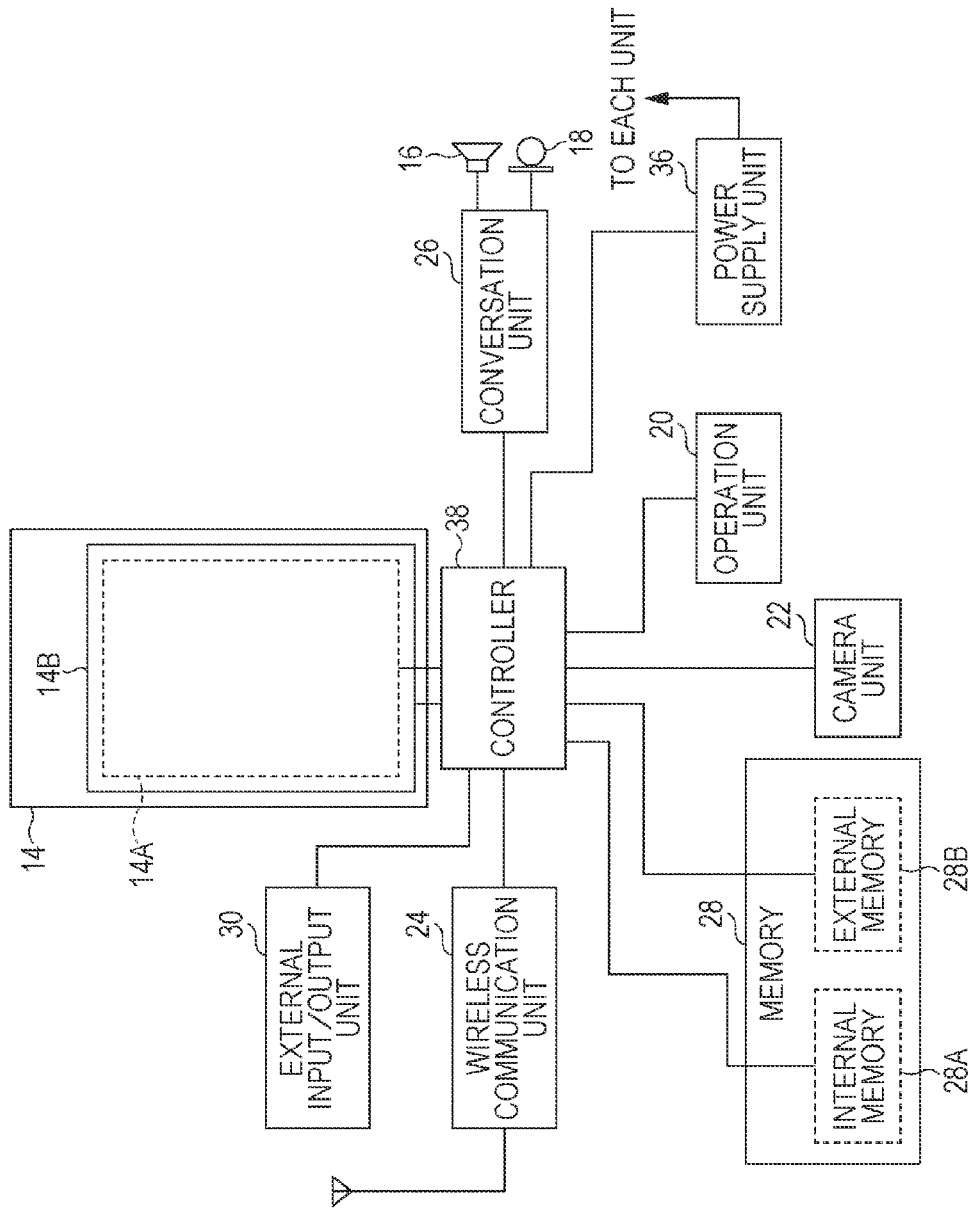
FIG. 2 is a block diagram illustrating the configuration of the smartphone according to the exemplary embodiments.

As illustrated in FIG. 2, the smartphone 10 includes, as major elements, the display input unit 14, the operation unit 20, and the camera unit 22, which are described above, and a wireless communication unit 24, a conversation unit 26, a memory 28, an external input/output unit 30, a power supply unit 36, and a controller 38. Note that the smartphone 10 has, as a main function, a wireless communication function of performing mobile wireless communication with a base station device via a mobile communication network.

The wireless communication unit 24 is configured to perform wireless communication with the base station device contained in the mobile communication network in response to an instruction from the controller 38. Using wireless communication, the wireless communication unit 24 transmits and receives various types of file data including audio data and image data, e-mail data, or the like to and from an external device, and receives web data, streaming data, or the like from an external device.

The display input unit 14 is a so-called touch panel display, under control of the controller 38, which visually communicates information to a user by displaying images (still images and moving images), character information, or the like, and detects a user operation performed in response to the displayed information.

As described above, the display input unit 14 according to the first exemplary embodiment includes the display panel 14A and the operation panel 14B.

Here, the display panel 14A uses a liquid crystal display (LCD), an organic electro-luminescence display (OELD), or the like as a display device. The operation panel 14B is a device that is stacked on the display panel 14A so that an image displayed on a display face of the display panel 14A is visually recognizable and that detects one or multiple coordinates operated by a finger of a user or a touch pen. In response to operating the device by using a finger of a user or a touch pen, the device outputs a detection signal generated in response to the operation to the controller 38. Next, on the basis of the received detection signal, the controller 38 detects the operated position (coordinates) on the display panel 14A.

Although the size of a display region of the display panel 14A may completely coincide with the size of the display panel 14A, the two sizes may not necessarily coincide with each other. A position detecting method adopted by the operation panel 14B includes a matrix switch method, a resistive film method, a surface acoustic wave method, an infrared method, an electromagnetic induction method, an electrostatic capacitance method, or the like, any of which is adoptable.

The conversation unit 26 includes the loudspeaker 16 and the microphone 18, which are described above. The conversation unit 26 converts the voice of a user input through the microphone 18 into audio data that may be processed by the controller 38, and outputs the audio data to the controller 38. The conversation unit 26 also decodes audio data received by the wireless communication unit 24 or the external input/output unit 30, and outputs sound, which is the decoded audio data, from the loudspeaker 16. As illustrated in FIG. 1, for example, the loudspeaker 16 and the microphone 18 are mounted on the same face as that on which the display input unit 14 is provided.

The operation unit 20 accepts an instruction from a user. For example, as illustrated in FIG. 1, the operation unit 20 is mounted on a lateral face of the housing 12 of the smartphone 10. The operation unit 20 is a push-button switch that is turned on when pressed with a finger or the like, and that enters an off state due to the resilience of a spring or the like when the finger is released from the switch.

The memory 28 stores a control program executed by the controller 38, control data, application software, address data that corresponds the name of a communication partner with a telephone number or the like, and transmitted and received e-mail data. The memory 28 also stores web data downloaded by web browsing, and downloaded content data. Further, the memory 28 temporarily stores streaming data or the like.

Here, the memory 28 according to the first exemplary embodiment includes an internal memory 28A included in the smartphone 10 and an external memory 28B with an external memory slot detachably attached to the smartphone 10. The internal memory 28A and the external memory 28B configuring the memory 28 are realized using flash memory type storage media or the like. Alternatively, the storage media may be hard disk type, multimedia card micro type, or card type memories (such as microSD (registered trademark) memories). Alternatively, the memories may be storage media such as random-access memories (RAMs) or read-only memories (ROMs).

The external input/output unit 30 plays the role of an interface with an external device connected to the smartphone 10. The external input/output unit 30 according to the first exemplary embodiment directly or indirectly connects to another external device in accordance with a predetermined communication standard or the like. The communication standard or the like is, for example, Universal Serial Bus (USB), Institute of Electrical and Electronic Engineers (IEEE) 1394, or a network (such as the Internet, a wireless local area network (LAN), or Bluetooth (registered trademark)). Alternatively, the communication standard or the like may be radio frequency identification (RFID) or Infrared Data Association (IrDA) (registered trademark). Further, the communication standard or the like may be ultra-wideband (UWB) (registered trademark) or Zigbee (registered trademark).

Here, the external device connected to the smartphone 10 according to the first exemplary embodiment is, for example, a wired/wireless headset, a wired/wireless external charger, a wired/wireless data port, a memory card connected via a card socket, or the like. The external device may be a subscriber identity module (SIM) card, a user identity module (UIM) card, or an external audio-video device connected via an audio-video input/output (I/O) terminal. Alternatively, the external device may be a wirelessly connected external audio-video device, a wired/wirelessly connected smartphone, a wired/wirelessly connected personal computer, a wired/wirelessly connected PDA, or an earphone. The external input/output unit 30 according to the first exemplary embodiment communicates data transmitted from these external devices to the elements included in the smartphone 10, and transmits data in the smartphone 10 to the external devices.

The power supply unit 36 is configured to supply electric power accumulated in a battery (not illustrated) to the units of the smartphone 10 in response to an instruction from the controller 38.

Further, the controller 38 includes a microprocessor. The controller 38 is configured to operate in accordance with a control program and control data stored in the memory 28, and collectively controls the units of the smartphone 10. In order to perform audio communication or data communication via the wireless communication unit 24, the controller 38 also has a mobile communication controlling function of controlling the units of a communication system, and an application processing function.

Here, the application processing function is realized by the controller 38 operating in accordance with application software stored in the memory 28. The application processing function includes, for example, an infrared communication function of controlling the external input/output unit 30 and performing data communication with a device facing the smartphone 10, an e-mail function of transmitting and receiving e-mail, and a web browsing function of browsing web pages.

Also, the controller 38 has an image processing function of displaying video on the display input unit 14 on the basis of image data (still image and moving image data) such as received data or downloaded streaming data. Note that the image processing function described here is the function of the controller 38 decoding the image data, applying image processing to the decoded image data, and displaying an image on the display input unit 14.

Further, the controller 38 executes display control of various types of information on the display panel 14A, and operation detection control that detects a user operation performed via the operation unit 20, the operation panel 14B, or the like.

By executing the above-described display control, the controller 38 displays an operation unit represented in software, such as an icon for activating application software or a scroll bar, or a window for writing e-mail. Note that the scroll bar described here is an operation unit represented in software for accepting an instruction to move a display part of an image that is too large to fit into the display region of the display panel 14A.

By executing the above-described operation detection control, the controller 38 detects a user operation performed via the operation unit 20, or accepts an operation performed on the icon via the operation panel 14B, or a character string entered in an entry column of the window.

Further, the controller 38 detects a gesture operation performed on the operation panel 14B, and executes a preset function in accordance with the detected gesture operation. Note that the gesture operation described here is not a conventional simple touch operation, but an operation that renders a track with a finger or the like, that simultaneously specifies multiple positions, or, by combining these operations, that renders a track for at least one of multiple positions.

The camera unit 22 is a digital camera that captures an image using an imaging element such as a complementary metal oxide semiconductor (CMOS) or a charge-coupled device (CCD). Under control of the controller 38, the camera unit 22 converts image data, obtained by capturing an image, to image data compressed in accordance with a predetermined standard such as the Joint Photographic Experts Group (JPEG). The camera unit 22 also records the converted image data in the memory 28, or outputs the image data to an external device via the external input/output unit 30, the wireless communication unit 24, or the like. In the smartphone 10, the camera unit 22 is mounted on the same face as that on which the display input unit 14 is mounted. However, the position at which the camera unit 22 is mounted is not limited to this position. The camera unit 22 may be mounted on the back of the display input unit 14, or multiple camera units 22 may be mounted. When multiple camera units 22 are mounted, the camera unit 22 to be used to capture an image is switched from one to another and the single camera unit 22 is used to capture an image, or multiple camera units 22 are simultaneously used to capture images.

Here, the camera unit 22 according to the first exemplary embodiment is used for various functions of the smartphone 10. For example, an image obtained with the camera unit 22 is displayed on the display panel 14A, or an image obtained with the camera unit 22 is used as an operation input on the operation panel 14B.

Further, the camera unit 22 adds audio information obtained by the microphone 18 (which may be converted by the controller 38 or the like from audio to text information) or the like to still image or moving image data. The camera unit 22 records the image data with the audio information added thereto in the memory 28, or outputs the image data with the audio information added thereto to an external device via the external input/output unit 30 or the wireless communication unit 24.

By the way, when image data is stored in at least one of the internal memory 28A and the external memory 28B and an instruction to display a list of pieces of image data is given in response to a user operation, the smartphone 10 according to the first exemplary embodiment controls the display panel 14A to display the list. In the first exemplary embodiment, image data obtained by capturing an image with an image capturing unit such as the camera unit 22 is applied as the above-described image data.

Also, the smartphone 10 according to the first exemplary embodiment stores, in the memory 28, file information specifying the attribute and classification item corresponding to each of multiple electronic files (hereinafter may also be simply referred to as "files") indicating the above-described image data. The smartphone 10 displays a list of images of the image data on the basis of the file information.

Figure 3:
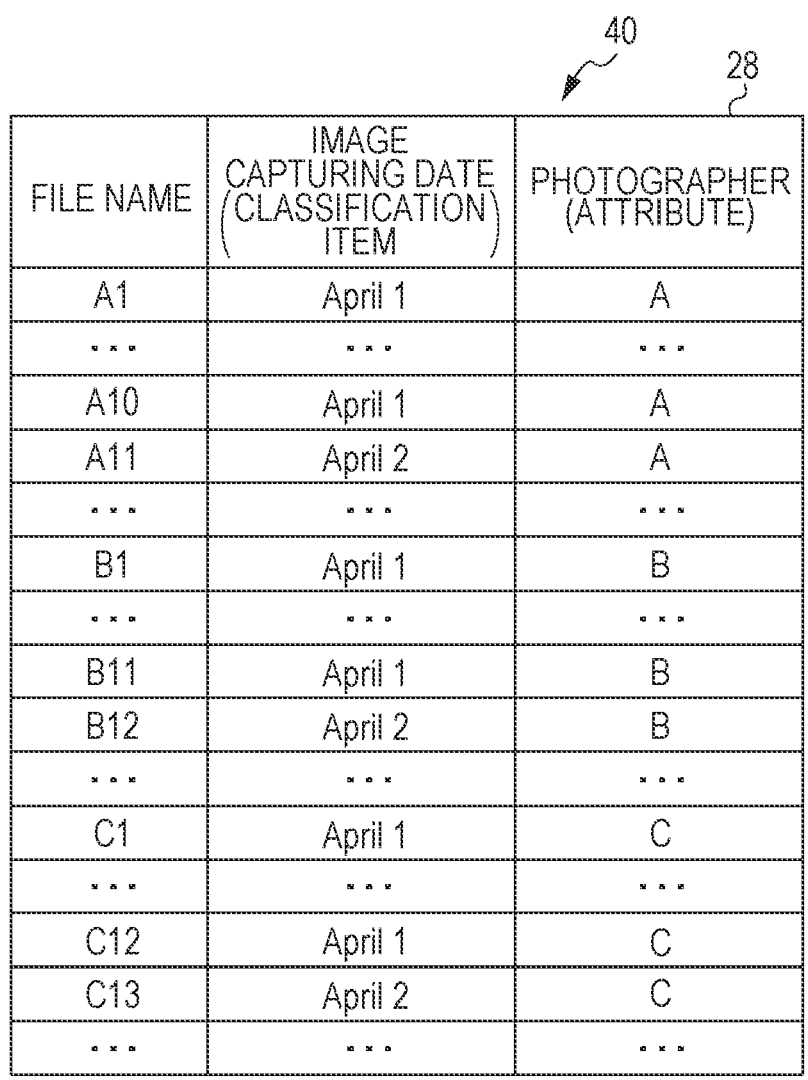
FIG. 3 is a schematic diagram illustrating an exemplary configuration of file information according to the exemplary embodiments.

As schematically illustrated in FIG. 3, file information 40 according to the first exemplary embodiment is information in which, for each file, file name information indicating the file name of the file, image capturing date information indicating the image capturing date of an image indicated by image data included in the file, and photographer information indicating the photographer of the image are associated with one another.

In the first exemplary embodiment, the photographer is applied as the attribute, and the image capturing date is applied as the classification item. Note that the attribute is not limited to the photographer, and arbitrary information such as the attribute of an image capturing device used for capturing the image, an image capturing condition, or a lens used for capturing the image may be applied. Also, the classification item is not limited to the image capturing date, and arbitrary information such as an image capturing object (landscape, person, etc.) or an image capturing place may be applied.

It is assumed that an operation of specifying scrolling via the operation panel 14B (hereinafter referred to as a "scrolling operation") is performed when the list is displayed on the smartphone 10 according to the first exemplary embodiment. In this case, control is performed to scroll each image displayed on the display panel 14A in response to the scrolling operation.

In the smartphone 10, a scroll mode for controlling scrolling of each image is alternately switched between an independent scroll mode and an interlocking scroll mode. In the first exemplary embodiment, switching of the scroll mode is performed by a user via the operation panel 14B, and the switched scroll mode is stored. The independent scroll mode according to the first exemplary embodiment is a mode for scrolling displayed images while causing the divided regions 48 to be independent of one another. The interlocking scroll mode according to the first exemplary embodiment is a mode for scrolling displayed images while causing the individual divided images 48 to interlock with one another.

Accordingly, the smartphone 10 according to the first exemplary embodiment displays a list of images indicated by the above-described image data (images obtained by capturing in the first exemplary embodiment). However, the smartphone 10 is not limited to this case. That is, a list of images of icons representing document files, audio files, application programs, or the like stored in the memory 28 may be displayed.

Figure 4:
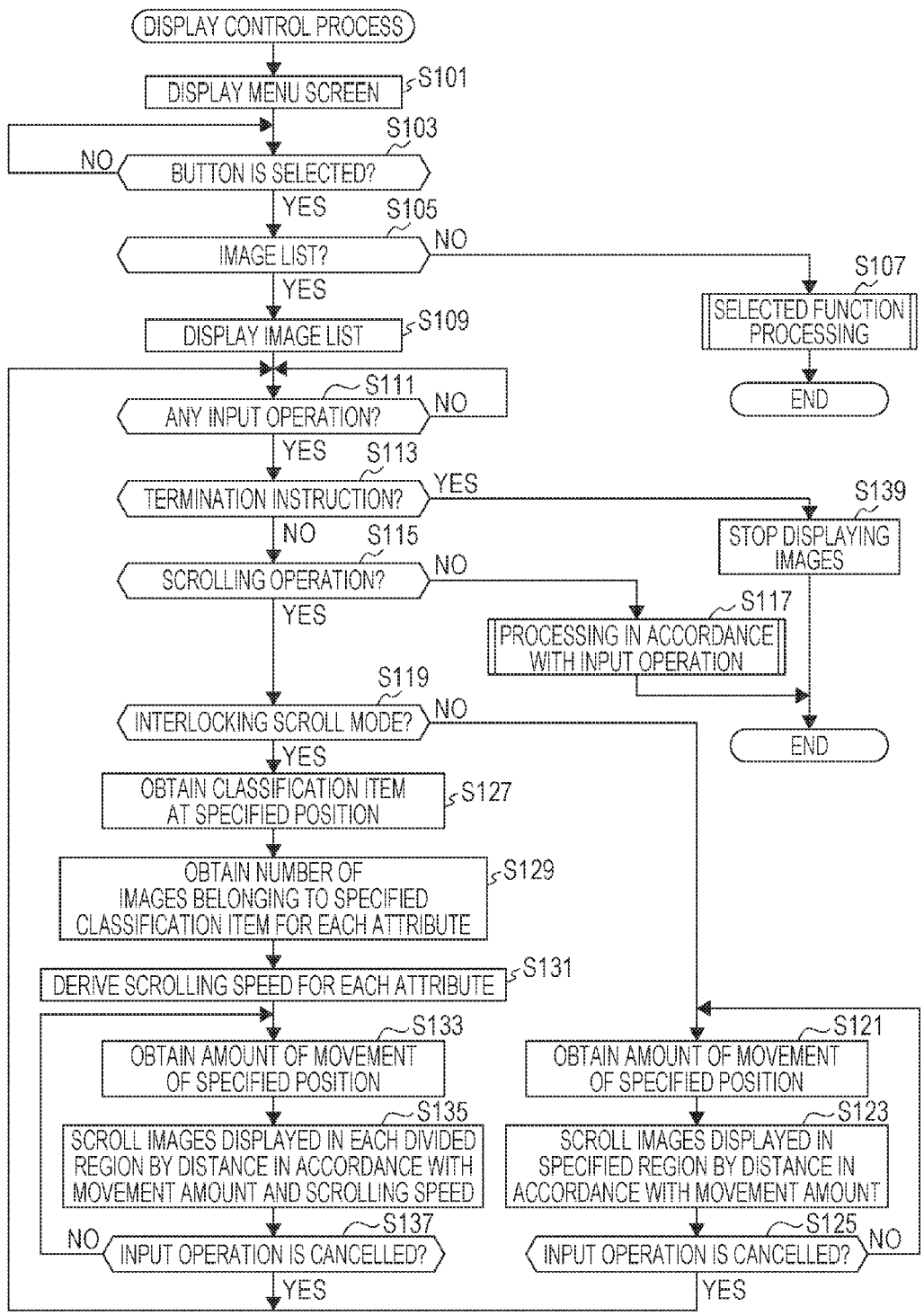
FIG. 4 is a flowchart illustrating the flow of a process of a display control processing program according to a first exemplary embodiment.

Next, referring to FIG. 4, the operation of the smartphone 10 according to the first exemplary embodiment will be described. FIG. 4 is a flowchart illustrating the flow of a process of a display control processing program executed by the controller 38 of the smartphone 10 in response to an execution instruction input via the operation panel 14B or the operation unit 20. This program is stored in advance in a predetermined region of the internal memory 28A.

In step S101 of FIG. 3, the controller 38 performs control to display a menu screen serving as a start point of a screen transition on the display panel 14A.

Figure 5:
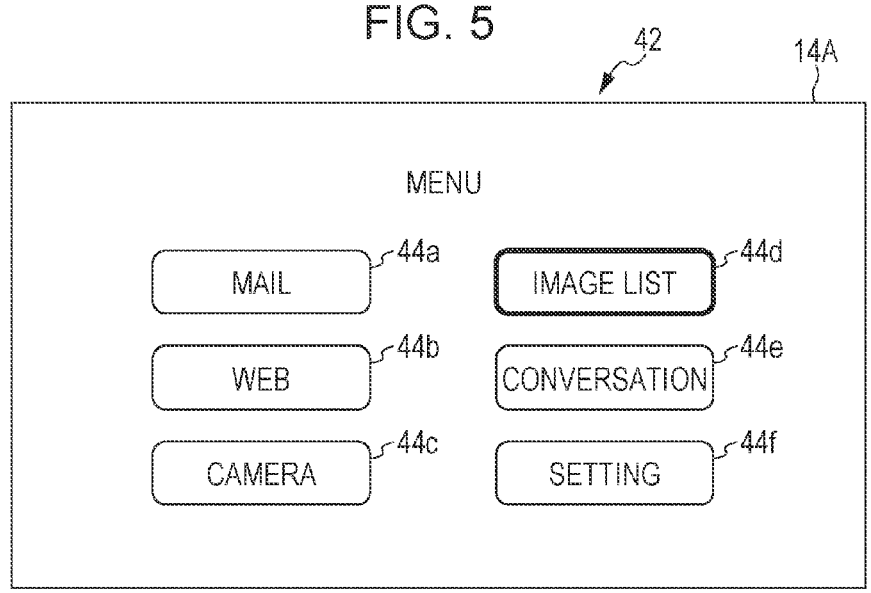
FIG. 5 is a front view illustrating an exemplary configuration of a menu screen according to the first exemplary embodiment.

As illustrated in FIG. 5, a menu screen 42 according to the first exemplary embodiment includes a mail button 44a for accepting an instruction to activate a mail function, and a web button 44b for accepting an instruction to activate a web browsing function. The menu screen 42 also includes a camera button 44c for accepting an instruction to activate a camera function, and an image list button 44d for accepting an instruction to activate the above-described list displaying function. The menu screen 42 also includes menu buttons such as a conversation button 44e for accepting an instruction to activate a conversation function, and a setting button 44f for accepting an instruction to activate various setting functions.

On the menu screen 42, a user selects one of menu items by touching the top of a menu button corresponding to a function to be activated. In response to this, the controller 38 activates the function corresponding to the selected menu button.

In step S103, the process waits for the user to select one of the menu buttons. In step S105, it is determined whether the menu button selected by the user is the image list button 44d. When the determination in step S105 is negative, the process proceeds to step S107, executes a function corresponding to the selected menu button, and terminates the display control processing program. In contrast, when the determination in step S105 is affirmative, the process proceeds to step S109.

In step S109, the controller 38 performs control to display, on the display panel 14A, an image list screen displaying a list of images indicated by files stored in the memory 28.

Figure 6:
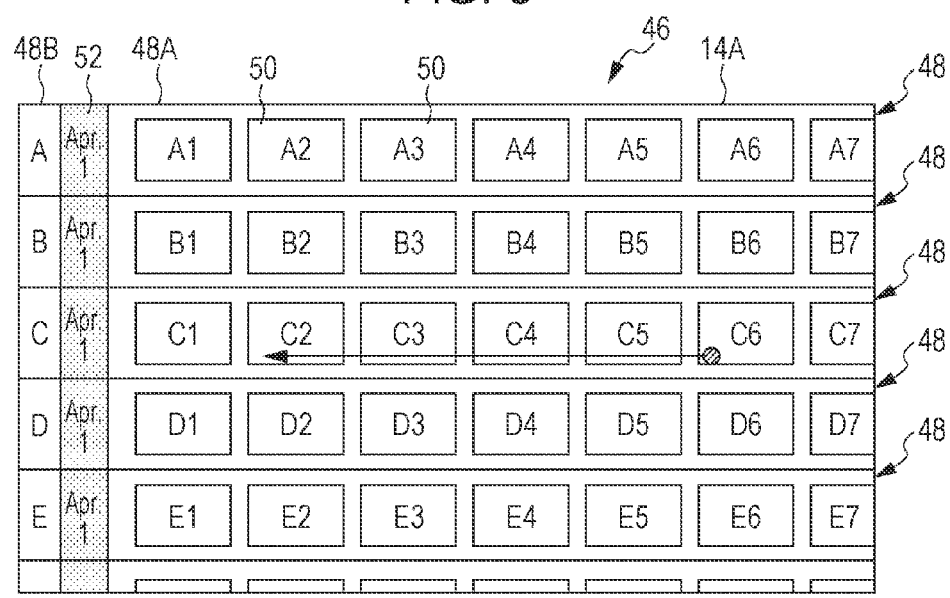
FIG. 6 is a front view illustrating an exemplary configuration of an image list screen according to the first exemplary embodiment.

As illustrated in FIG. 6, an image list screen 46 according to the first exemplary embodiment is the display region of the display panel 14A, which is divided into multiple divided regions 48 divided in a predetermined direction (the vertical direction in front view in FIG. 6 in the first exemplary embodiment; hereinafter referred to as the "dividing direction"). The divided regions 48 are further divided into image display regions 48A displaying images 50, and attribute display regions 48B displaying attributes corresponding to the images 50 displayed in the image display regions 48A.

The individual images 50 displayed in the list are allocated to the divided regions 48 according to predetermined attributes (photographers in the first exemplary embodiment) and are displayed in the image display regions 48A of the divided regions 48. Also, the images 50 allocated according to the attributes are arranged in a direction intersecting the above-described dividing direction (the horizontal direction in front view in FIG. 6 in the first exemplary embodiment; hereinafter referred to as the "arrangement direction") according to each classification item (image capturing date in the first exemplary embodiment) and collectively displayed in the image display regions 48A. The smartphone 10 according to the first exemplary embodiment arranges the images 50 in the arrangement direction according to each image capturing date along the course of time.

Electronic files include document files including document data, image files including image data of rendered images, photograph files including image data of images obtained by capturing, and the like. Generally these electronic files each have updated time, browsed time, generated time, or the like as information regarding the time. In the first exemplary embodiment, the case in which the images 50 indicated by photograph files are arranged and displayed is given by way of example. Thus, each of the images 50 is arranged on the basis of the image capturing time such as the image capturing date. That is, to organize photograph files, photograph files whose image capturing times are close to each other are highly likely to have similar image capturing conditions, image capturing places, or the like. In contrast, photograph files whose updated times or browsed times are close to each other are highly likely to have different image capturing conditions, image capturing places, or the like. Therefore, organizing photograph files is suitably performed on the basis of image capturing times. However, the method of arranging electronic files is not limited to the method based on the image capturing time, and electronic files may be arranged on any of the updated time, browsed time, and the like.

Further, a classification item display region 52 displaying information indicating the classification item of each image 50 is displayed at a predetermined position in a region in which images 50 belonging to each classification item are collectively displayed (hereinafter referred to as a "classification item region") in each image display region 48A. In the first exemplary embodiment, the vicinity of a display start position (the front end of a classification item region) in the arrangement direction is adopted as the predetermined position. However, the predetermined position is not limited to this position. That is, the predetermined position may be the vicinity of a display end position (the rear end of a classification item region) in the arrangement direction of images 50 belonging to each classification item, the center of the classification item region, or the like.

In step S111, the controller 38 enters standby until an operation is performed on one of the operation panel 14B and the operation unit 20. In step S113, it is determined whether the input operation is an input operation of giving an instruction to terminate the display control processing program. In the smartphone 10 according to the first exemplary embodiment, when the operation unit 20 positioned on the left side in front view of the smartphone 10 is pressed, processing being executed at that time is terminated. Therefore, determination of whether the operation unit 20 is pressed enables determination of whether the input operation is an input operation of giving an instruction to terminate the display control processing program.

When the determination in step S113 is negative, the process proceeds to step S115, and it is determined whether the input operation is a scrolling operation specifying a divided region 48. That is, the user performs, on the image list screen 46, a scrolling operation by touching the top of a divided region 48 in which images to be scrolled are displayed, which is followed by sliding the touching position in a direction to be scrolled. The controller 38 determines that a scrolling operation is performed when a position in any of the image display regions 48A is specified, and then the position that has been specified (hereinafter referred to as the "specified position") moves in the arrangement direction.

When the determination in step S115 is negative, the process proceeds to step S117, processing in accordance with the input operation is executed, and the display control processing program is terminated. For example, it is assumed that the user specifies one of the images 50 by performing an input operation of touching the image 50 via the operation panel 14B with a fingertip and quickly releasing the fingertip. In this case, as processing in accordance with the input operation, processing of enlarging the specified image 50 and displaying the enlarged image 50 in the entire display region of the display panel 14A may be given by way of example.

In contrast, when the determination in step S115 is affirmative, the process proceeds to step S119, and it is determined whether the scroll mode is set to the interlocking scroll mode. When the determination in step S119 is negative, it is assumed that the smartphone 10 is set to the independent scroll mode, and the process proceeds to step S121.

In step S121, the amount of movement of the specified position in the scrolling operation is obtained. In step S123, the images 50 displayed in the divided region 48 displayed at the specified position (hereinafter referred to as the "specified region") are scrolled by a distance in accordance with the amount of movement of the specified position, in a direction in which the specified position moves (hereinafter referred to as a "specified direction"). Alternatively, the images 50 may be scrolled by a distance in accordance with the speed of movement of the specified position.

Figure 7:
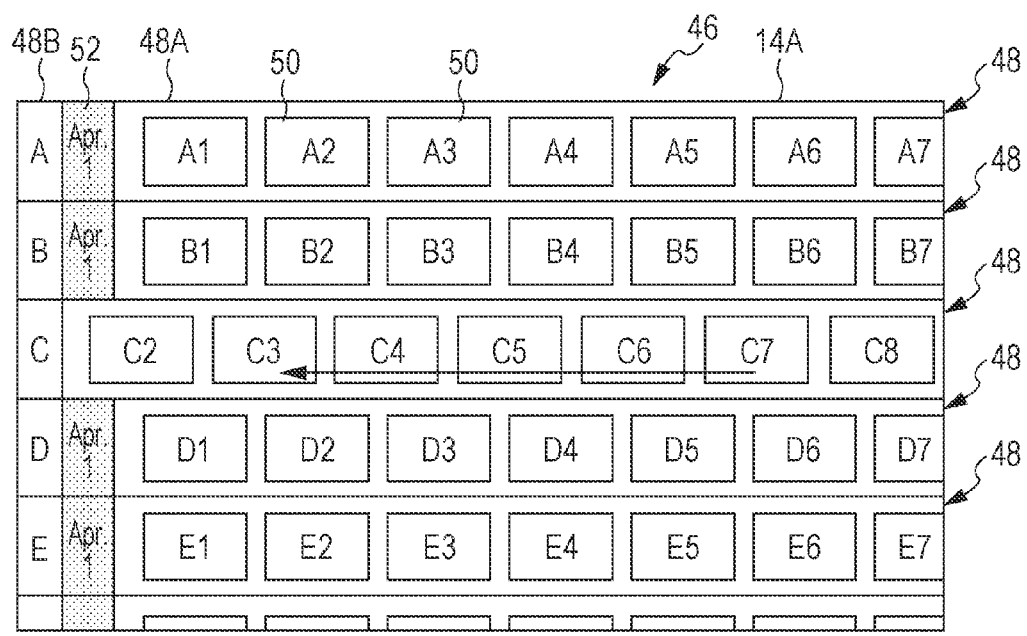
FIG. 7 is a diagram provided for describing the state of an operation performed on the image list screen according to the first exemplary embodiment.

As illustrated in FIG. 6, it is assumed that a position in the divided region 48 displaying images 50 of photographer C is specified, and then a scrolling operation of the images 50 in the classification item region is performed with a direction from the display end position to the display start position, which serves as a specified direction. In this case, as illustrated in FIG. 7, the controller 38 performs control to scroll the images 50 displayed in the divided region 48 displaying the images 50 of photographer C, which is the specified region, in the specified direction by a distance in accordance with the speed of movement of the specified position. Alternatively, the images 50 may be scrolled by a distance in accordance with the distance of the movement of the specified position.

In step S125, it is determined whether touching of the operation panel 14B by the user is released, thereby determining whether the scrolling operation, which is the input operation, is cancelled. When the determination in step S125 is negative, the process returns to step S121 described above. In contrast, when the determination in step S125 is affirmative, the process returns to step S111 described above.

In contrast, when the determination in step S115 is affirmative, the controller 38 scrolls the images 50 in the interlocking scrolling mode by performing processing in steps S127 to S137 described later.

Here, for example, in the file information 40 illustrated in FIG. 3, there are ten files A1 to A10 of image data of images 50 captured by photographer A on 4/1 (April 1); there are eleven files B1 to B11 of image data of images 50 captured by photographer B on 4/1; and there are twelve files C1 to C12 of image data of images 50 captured by photographer C on 4/1.

In this case, the controller 38 takes into consideration that the number of images 50 captured on each capturing date is different for each photographer, that is, the number of images 50 belonging to the same classification item is different from one divided region to another, and determines the scrolling speed on the basis of the number of images 50 belonging to each classification item.

That is, in step S127, the controller 38 obtains the classification item of images 50 displayed in the classification item region displayed at the specified position (hereinafter referred to as the "specified classification item"). At this time, the controller 38 obtains, as the classification item, the image capturing date information associated with the images 50 in the file information 40.

In step S129, the controller 38 obtains, for each attribute, the number of images 50 belonging to the specified classification item on the basis of the file information 40. For example, as illustrated in FIG. 6, when the specified classification item is 4/1, the controller 38 obtains, for each photographer, the number of files whose image capturing date information is 4/1 from the file information 40.

In step S131, the controller 38 derives the scrolling speed for each attribute in accordance with the number of images 50 belonging to the specified classification item. At this time, the scrolling speed of images 50 displayed in the specified region is determined at first. For example, as illustrated in the upper portion of FIG. 8, it is assumed that the specified position is in the divided region 48 displaying the images 50 of photographer B. It is also assumed that the scrolling operation is performed in the leftward direction in front view in FIG. 8, that is, the scrolling operation of the images 50 in the classification item region is performed in a direction from the display end position to the display start position. In this case, the controller 38 first determines the speed of scrolling the images 50 displayed in the specified region. The scrolling speed may be a speed in accordance with the scrolling operation or a predetermined speed.

Next, the speed of scrolling the images 50 displayed in divided regions 48 other than the specified region is derived for each attribute as a speed at which predetermined positions in the classification item regions are synchronous among the divided regions 48. Note that, in the first exemplary embodiment, the predetermined positions are the display start positions or the display end positions. Also, in the first exemplary embodiment, the scrolling speed is determined for each attribute on the basis of the number of images 50 belonging to the specified classification item.

As described above, for example, it is assumed that there are eleven images 50 belonging to the classification item "4/1" of photographer B, whereas there are ten images 50 belonging to the classification item "4/1" of photographer A, and twelve images 50 belonging to the classification item "4/1" of photographer C. In this case, the number of images 50 belonging to the specified classification item of photographer B displayed in the specified region is compared with the number of images 50 belonging to the specified classification item of another attribute, and the scrolling speeds at which the display end positions of images belonging to the specified classification item are synchronous among different attributes are derived. Specifically, as illustrated in the lower portion of FIG. 8, the display end position of the scrolled eleven images 50 of photographer B is caused to coincide with the display end position of the scrolled ten images 50 of photographer A. Similarly, the display end position of the scrolled eleven images 50 of photographer B is caused to coincide with the display end position of the scrolled twelve images 50 of photographer C.

Figure 8:
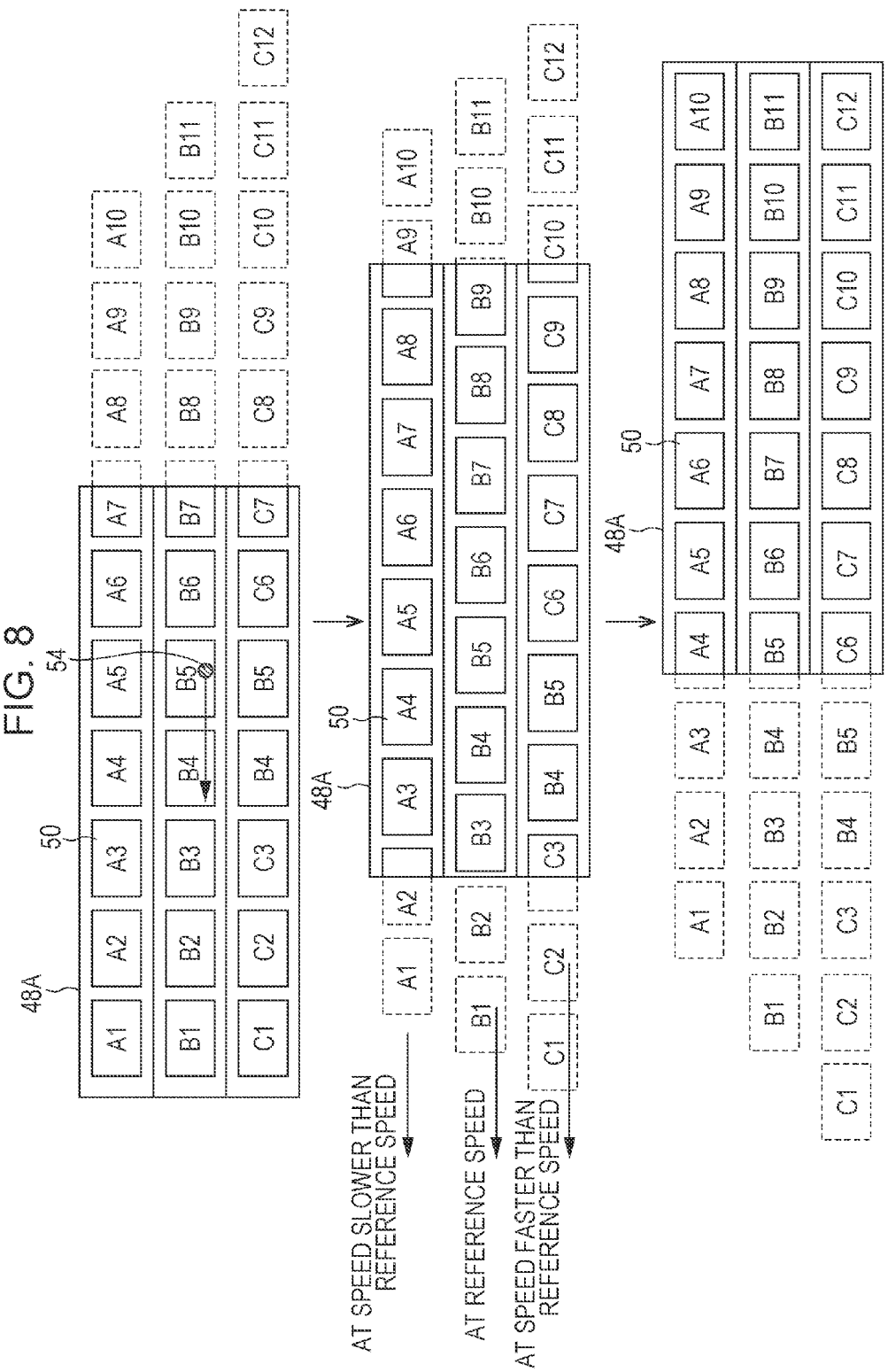
FIG. 8 is a diagram provided for describing a method of deriving a scrolling speed according to each attribute on the image list screen according to the first exemplary embodiment.
Figure 9:
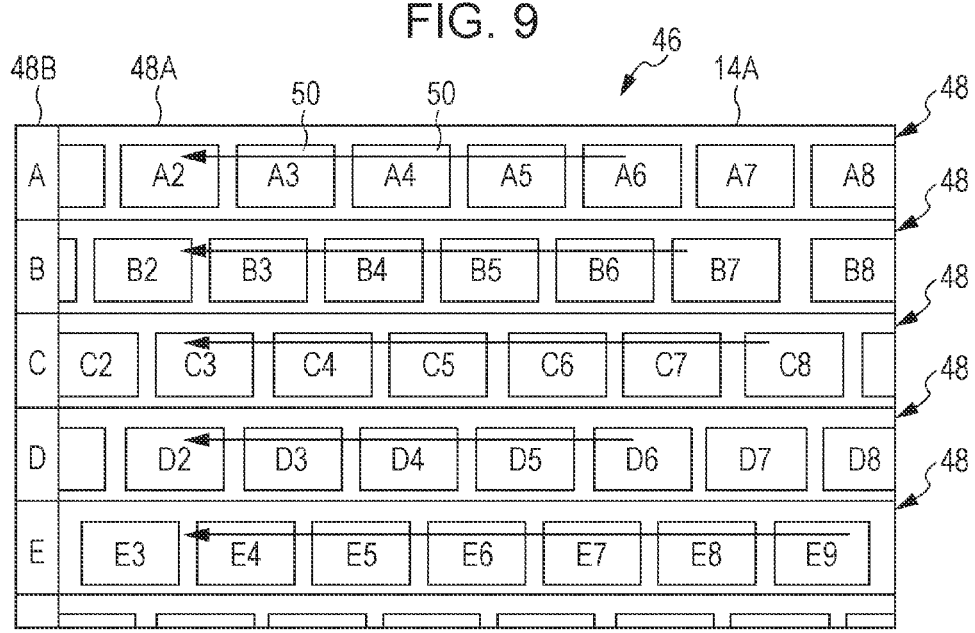
FIG. 9 is a diagram provided for describing the state of an operation performed on the image list screen according to the first exemplary embodiment.
Figure 10:
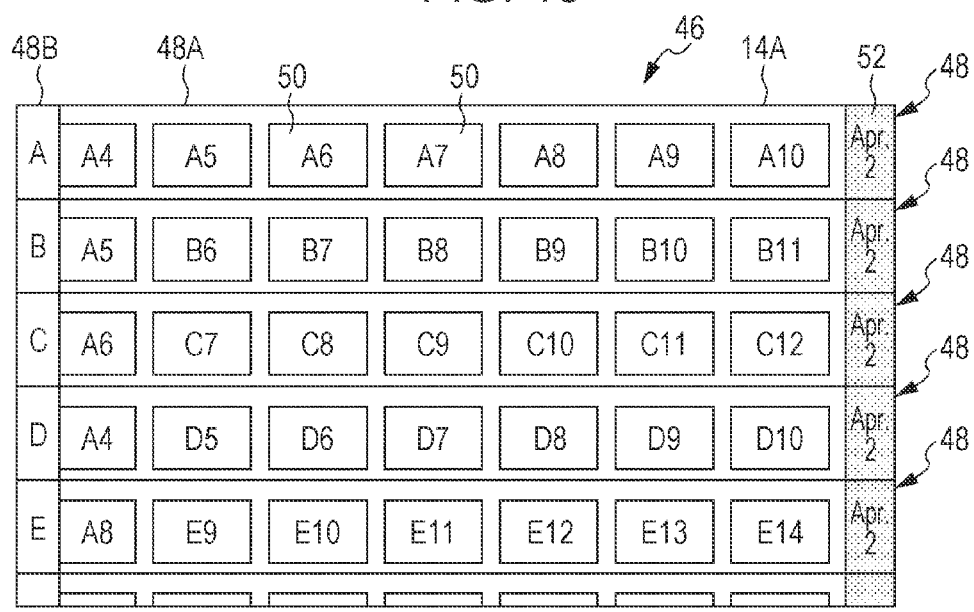
FIG. 10 is a diagram provided for describing the state of an operation performed on the image list screen according to the first exemplary embodiment.

That is, as illustrated in the middle portion of FIG. 8, when the speed of scrolling the images 50 belonging to the specified classification item region of photographer B serves as a reference speed, the images 50 of photographer C, which are greater in quantity than those of photographer B, are scrolled at a speed faster than the reference speed. Also, the images 50 of photographer A, which are fewer in quantity than those of photographer B, are scrolled at a speed slower than the reference speed. With this processing, as illustrated in FIG. 9, the images 50 displayed in the divided regions 48 are scrolled at different speeds. Also, as illustrated in FIG. 10, the images 50 belonging to the specified classification item regions of photographers A to C are scrolled at scrolling speeds at which the display end positions of the specified classification item regions coincide with one another. At this time, the display start positions of the classification item regions in which the images 50 belonging to the classification item arranged next to the specified classification item also coincide with one another.

On the contrary, it is assumed that the scrolling operation is performed in the rightward direction in front view in FIG. 8, that is, the scrolling operation of the images 50 in the classification item region is performed in a direction from the display start position to the display end position. In this case, the scrolling speeds at which the display start positions of images belonging to the specified classification item of different attributes coincide with one another are derived on the basis of the number of images 50 belonging to the specified classification item of photographer B displayed in the specified region and the number of images 50 displayed in the specified classification item of another attribute. Accordingly, the images 50 belonging to the specified classification item regions of photographers A to C are scrolled at scrolling speeds at which the display start positions of the specified classification item regions coincide with one another. At this time, the display end positions of the classification item regions in which the images 50 belonging to the classification item arranged prior to the specified classification item region also coincide with one another.

In step S133, the amount of movement of the specified position is obtained. At this time, when the processing in step S133 is performed for the first time after the scrolling operation is started, the controller 38 obtains the amount of movement after the scrolling operation is started. In contrast, when the processing in step S133 is performed for the second time or more, the controller 38 obtains the amount of movement after the amount of movement is previously obtained.

In step S135, the images 50 displayed in each divided region 48 are scrolled by a distance in accordance with the obtained amount of movement of the specified position and the scrolling speed derived by the processing in step S131. At this time, the controller 38 may scroll the images 50 by a distance in accordance with, for example, the speed of movement of the specified position and the scrolling speed.

The smartphone 10 according to the first exemplary embodiment excludes, from being a target of scrolling, images 50 displayed in a divided region 48 in which no image 50 belonging to the specified classification item region exists when the scrolling operation is performed. At this time, the smartphone 10 performs control in step S135 not to scroll these images 50 by causing the scrolling speed to be zero in step S131. However, images 50 displayed in a divided region 48 in which no image 50 belonging to the specified classification item region exists may be scrolled in accordance with a predetermined speed or a speed in accordance with the speed of scrolling the images 50 belonging to the specified region.

In step S137, it is determined whether touching of the operation panel 14B by the user is released, thereby determining whether the input operation is cancelled. When the determination in step S137 is negative, the process returns to step S133 described above. In contrast, when the determination in step S137 is affirmative, the process returns to step S111 described above.

In contrast, when the determination in step S113 is affirmative, the process proceeds to step S139, and the controller 38 controls the display panel 14A to stop displaying the image list screen 46, and terminates the display control processing program.

Second Exemplary Embodiment

The smartphone 10 according to the first exemplary embodiment performs control to scroll the images 50 displayed in the divided regions 48 in an interlocking manner when a scrolling operation is performed via the operation panel 14B. In contrast, the smartphone 10 according to a second exemplary embodiment performs control to scroll the images 50 displayed in the divided regions 48 in an interlocking manner among the divided regions 48 when a classification item is specified via the operation panel 14B.

Since the configuration of the smartphone 10 according to the second exemplary embodiment is the same as or similar to that of the smartphone 10 according to the first exemplary embodiment, a description thereof will be omitted here.

Figure 11:
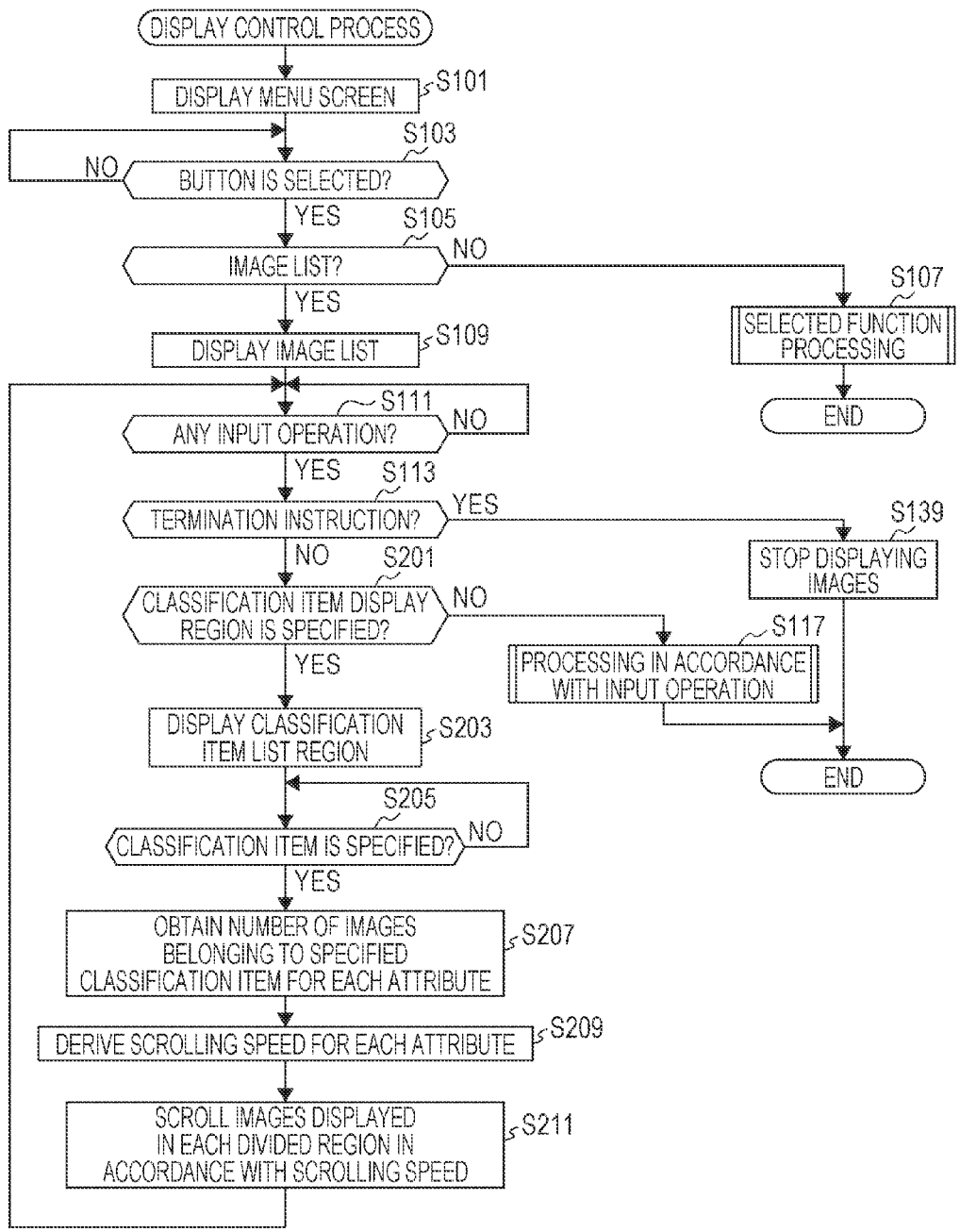
FIG. 11 is a flowchart illustrating the flow of a process of the display control processing program according to a second exemplary embodiment.

Next, referring to FIG. 11, the operation of the smartphone 10 according to the second exemplary embodiment will be described. FIG. 11 is a flowchart illustrating the flow of a process of the display control processing program according to the second exemplary embodiment, which is executed by the controller 38 of the smartphone 10 in response to an execution instruction input via the operation panel 14B or the operation unit 20. This program is stored in advance in a predetermined region of the internal memory 28A.

Firstly, in steps S101 to S113, the same processing as that in steps S101 to S113 of the first exemplary embodiment is performed. When the determination in step S113 is affirmative, the process proceeds to step S139, and the same processing as that in step S139 is performed, and the display control processing program is terminated. In contrast, when the determination in step S113 is negative, the process proceeds to step S201.

In step S201, it is determined whether the input operation is an operation of specifying a classification item display region 52. At this time, the controller 38 determines that the input operation is an operation of specifying a classification item display region 52 when an operation of touching any of the classification item display regions 52 is performed via the operation panel 14B.

When the determination in step S201 is negative, the process proceeds to step S117, and the same processing as that in step S117 of the first exemplary embodiment is performed, and the display control processing program is terminated. In contrast, when the determination in step S201 is affirmative, the process proceeds to step S203.

Figure 12:
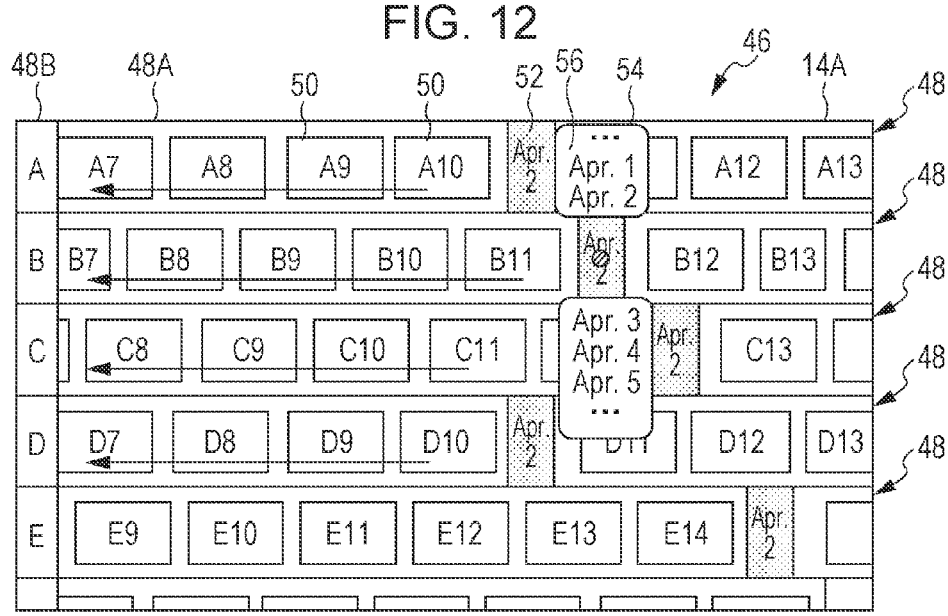
FIG. 12 is a diagram provided for describing the state of an operation performed on the image list screen according to the second exemplary embodiment.

In step S203, a classification item list region 54 displaying a list of classification items is displayed in the display region of the display panel 14A. For example, as illustrated in FIG. 12, it is assumed that the classification item display region 52 displayed in the divided region 48 of photographer B is specified by a user operation. In this case, the controller 38 performs control to display the classification item list region 54 displaying a list of classification items 56 around the specified classification item display region 52 (a position adjacent to the specified classification item display region 52 in the vertical direction in front view in FIG. 12 in the second exemplary embodiment). On the operation panel 14B, the user touches any of the classification items 56 displayed in the classification item list region 54, thereby specifying the classification item 56.

In step S205, the controller 38 enters standby until any of the classification items 56 displayed in the classification item list region 54 is specified. At this time, the controller 38 determines that any of the classification items 56 is specified when an operation of touching the classification item 56 is performed via the operation panel 14B.

In step S207, the number of images 50 belonging to the specified classification item, which is the classification item that has been specified, is obtained for each attribute on the basis of the file information 40.

In step S209, the scrolling speed is derived for each attribute on the basis of the images 50 belonging to the specified classification item.

In step S211, the controller 38 performs control to scroll the images 50 displayed in each divided region 48 in accordance with the scrolling speed of each attribute, and the process returns to step S111.

Figure 13:
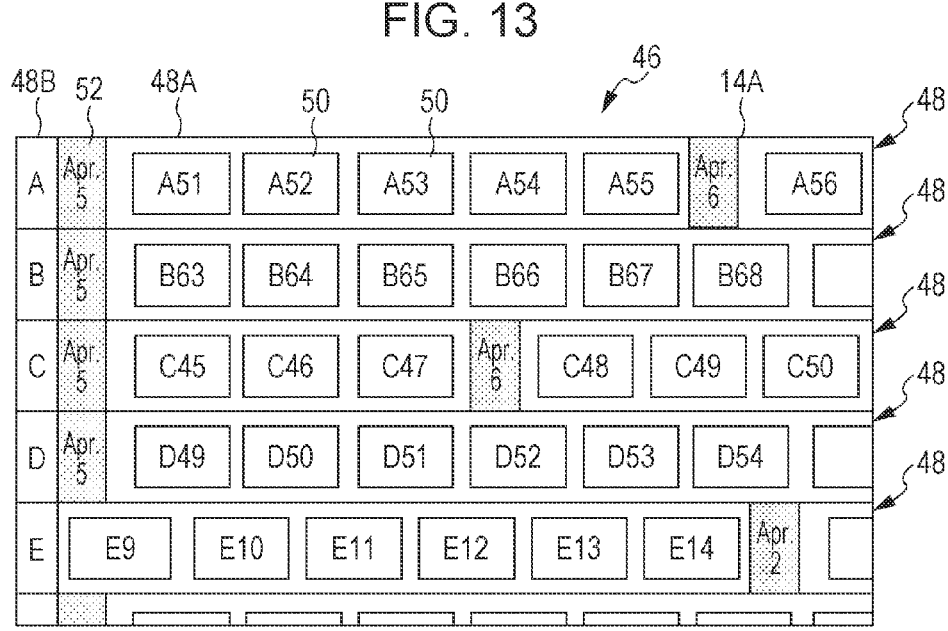
FIG. 13 is a diagram provided for describing the state of an operation performed on the image list screen according to the second exemplary embodiment.

For example, when the classification item 56 of "4/5" is specified from the classification item list region 54, as illustrated in FIG. 13, the controller 38 scrolls the images 50 belonging to the classification item "4/5" at speeds at which the display start positions of the images 50 coincide with one another in the arrangement direction.

In the second exemplary embodiment, when the classification item display region 52 is specified, the classification item list region 54 is displayed. However, the second exemplary embodiment is not limited to this case. That is, when the classification item display region 52 is specified in step S201, the controller 38 may regard that a classification item indicated in the specified classification item display region 52 is specified. In this case, after the determination in step S201 becomes affirmative, the process proceeds to step S207 without performing the processing in step S203 and the processing in step S205.

Figure 14:
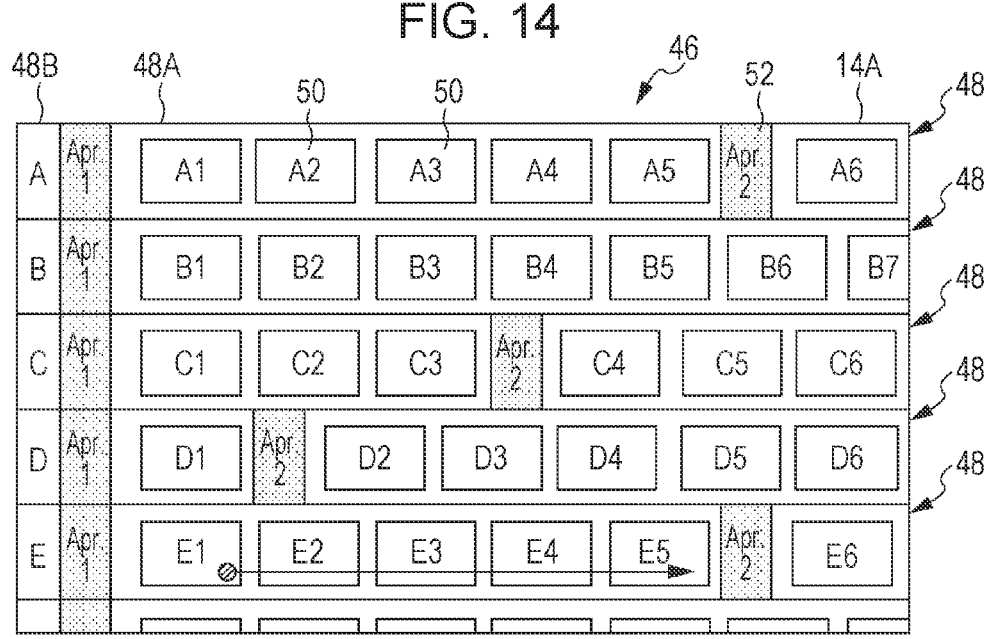
FIG. 14 is a diagram provided for describing the state of an operation performed on the image list screen according to the second exemplary embodiment.

Alternatively, when scrolling the images 50 displayed in the divided regions 48, the controller 38 may scroll the images 50 in a direction different for each divided region 48. For example, as illustrated in FIG. 14, it is assumed that a scrolling operation is performed in a direction of displaying the display end position of the specified classification item. At this time, the controller 38 scrolls, in a direction contrary to the scrolling direction, images 50 displayed in a divided region 48 in which the display end position of the specified classification item is displayed further in the scrolling direction than a goal position finally displayed by scrolling the images 50. In contrast, the controller 38 scrolls, in the scrolling direction, images 50 displayed in a divided region 48 in which the display end position of the specified classification item is displayed further in the contrary direction than the goal position.

Figure 15:
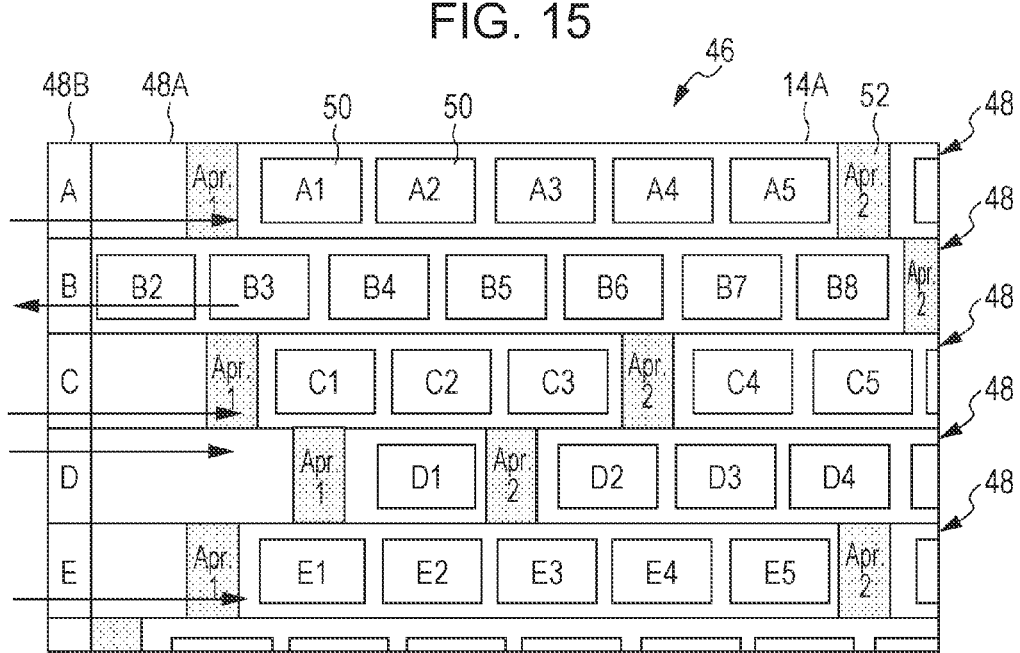
FIG. 15 is a diagram provided for describing the state of an operation performed on the image list screen according to the second exemplary embodiment.
Figure 16:
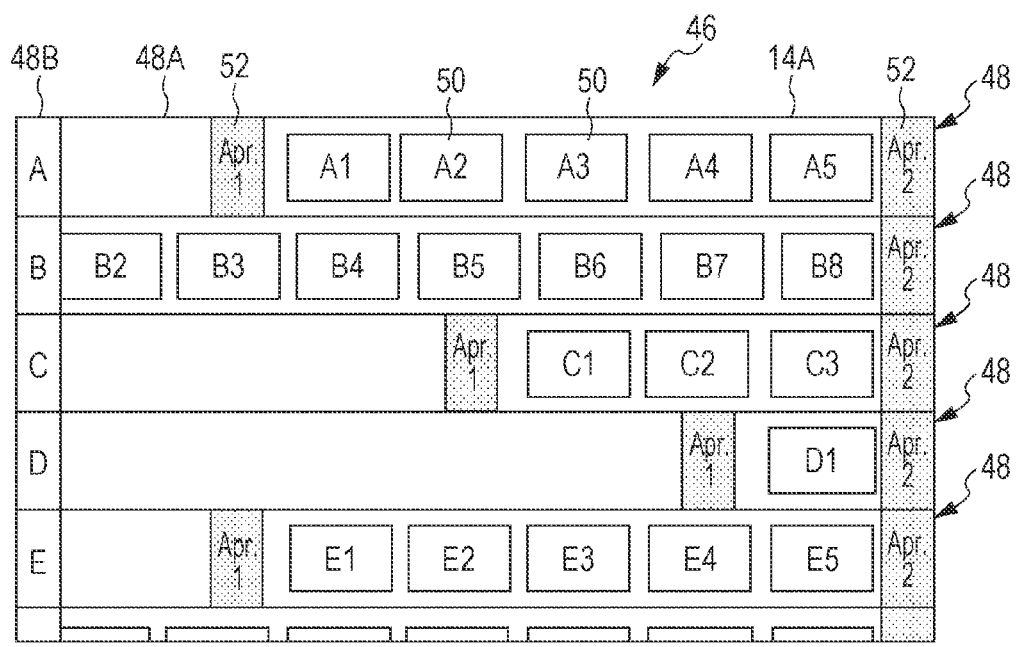
FIG. 16 is a diagram provided for describing the state of an operation performed on the image list screen according to the second exemplary embodiment.

For example, as illustrated in FIG. 15, the images 50 displayed in the divided regions 48 of photographers A, C, D, and E are scrolled in the scrolling direction (rightward direction in front view in FIG. 15). In contrast, the images 50 displayed in the divided region 48 of photographer B are scrolled in a direction contrary to the scrolling direction (leftward direction in front view in FIG. 15). Accordingly, as illustrated in FIG. 16, the images 50 belonging to the specified classification item regions of photographers A to E are scrolled at speeds and in directions in which the display end positions of the specified classification item regions coincide with one another.

When the images 50 displayed in the divided regions 48 are scrolled in contradicting directions among the divided regions 48, it is assumed that the images 50 displayed in a specified region are scrolled in a direction from the display end position to the display start position. In this case, scrolling is performed at a scrolling speed at which the display end position of these images 50 coincides with the display start position of images 50 displayed in a divided region 48 to be scrolled in the contrary direction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
   at least one processor configured to execute:
   a first controller configured to divide a display area into a plurality of regions arranged in a first direction, and to display an image in an individual region of the plurality of regions according to an attribute of the image, and further configured to divide the individual region into a plurality of divided regions and arrange the image in a divided region among the plurality of divided regions based on a classification item of the image;
   a detector configured to detect a scrolling operation of scrolling a displayed image in a second direction perpendicular to the first direction; and
   a second controller to scroll the image displayed in each of the divided regions at a speed in response to the scrolling operation being detected by the detector, the speed at which a first position of a first classification item in a first divided region matches a second position of a second classification item in a second divided region,
   wherein the first position is a same position as the second position on an axis parallel to the second direction.

2. The display control apparatus according to claim 1,
   wherein the detector is configured to detect a scrolling operation performed on an image displayed in any of the plurality of divided regions, and detect a selecting operation of a classification, wherein the second controller is configured to set the speed of scrolling for images displayed in the plurality of divided regions in accordance with the number of images belonging to a divided region corresponding to the classification.

3. The display control apparatus according to claim 2, wherein the second controller is further configured to exclude, a divided region that does not contain an image corresponding to the classification from being a control target of the scrolling operation.

4. The display control apparatus according to claim 3, wherein the second controller is further configured to determine a direction to scroll the images displayed in the divided region based on whether the first classification item is present at a location in a direction of scrolling or a location opposite to the direction of scrolling and scroll the images displayed in the divided region to a position in which the first classification item is displayed with the second classification item.

5. The display control apparatus according to claim 2, wherein the second controller is further configured to determine a direction to scroll the images displayed in the divided region based on whether the first classification item is present at a location in a direction of scrolling or a location opposite to the direction of scrolling and scroll the images displayed in the divided region to a position in which the first classification item is displayed with the second classification item.

6. The display control apparatus according to claim 1, wherein the images are images obtained by capturing, wherein the classification item is information indicating a time range in which each of the images is captured, and wherein the first controller performs control to collectively display the images according to each time range, in an order along the course of time within the same divided region, for different attributes among the divided regions.

7. The display control apparatus according to claim 1, wherein the first controller is further configured to display, in a vicinity of the divided region in which the image is displayed, the classification item,
wherein the detector is further configured to detect a first specifying operation of specifying the displayed classification item, and
wherein the second controller is further configured to scroll to the classification item specified by the first specifying operation.

8. The display control apparatus according to claim 7, wherein, when the specifying operation is detected by the detector, the first controller is further configured to display a list of classification items in the display region,
wherein the detector is further configured to detect a second specifying operation of specifying one of the classification items displayed in the list of classification items, and
wherein the second controller is further configured to scroll to the one classification item specified by the second specifying operation.

9. The display control apparatus according to claim 1, further comprising:

a switching unit configured to switch between a first mode of scrolling the images while causing the plurality of regions to be scrolled independent of one another and a second mode of scrolling the images while causing the plurality of regions to interlock with one another,
wherein the second controller is further configured to scroll the image only when the switching unit switches to the second mode.

10. An image display apparatus comprising:
the display control apparatus according to claim 1; and
a display controlled by the display control apparatus.

11. The display control apparatus according to claim 1, wherein a speed at which the second position of the second classification item in the second divided region matches the speed of the first position of the first classification item.

12. A non-transitory computer readable medium storing a program causing a computer to execute a process, the process comprising:
performing control to divide a display area into a plurality of regions arranged in a first direction, and to display an image in an individual region of the plurality of regions according to an attribute of the image and to divide the individual region into a plurality of divided regions and arrange the image in a divided region from among the plurality of divided regions based on a classification of the image;
detecting a scrolling operation of scrolling a displayed image in a second direction perpendicular to the first direction; and
scrolling the image displayed in the divided region in response to the scrolling operation being detected, and when a plurality of the divided regions contain displayed images, controlling to scroll the displayed images in the second direction at a synchronous speed.

13. A display control method comprising:
performing control to divide a display area into a plurality of regions arranged in a first direction, and to display an image in an individual region of the plurality of regions according to an attribute of the image and to divide the individual region into a plurality of divided regions and arrange the image in a divided region from among the plurality of divided regions based on a classification of the image;
detecting a scrolling operation of scrolling a displayed image in a second direction perpendicular to the first direction; and
scrolling the image displayed in the divided region in response to the scrolling operation being detected, and when a plurality of the divided regions contain displayed images, controlling to scroll the displayed images in the second direction at a synchronous speed.

14. The display control apparatus according to claim 1, wherein the second controller is further configured to determine a direction to scroll the images displayed in the divided region based on whether the first classification item is present at a location in a direction of scrolling or a location opposite to the direction of scrolling and scroll the images displayed in the divided region to a position in which the first classification item is displayed with the second classification item.

* * * * *